United States Patent [19]

Tsuruoka

[11] Patent Number: 4,538,566
[45] Date of Patent: Sep. 3, 1985

[54] COMBUSTION CHAMBER IN A DIESEL ENGINE

[75] Inventor: Shingo Tsuruoka, Hino, Japan

[73] Assignee: Hino Jidosha Kogyo Kabushiki Kaisha, Tokyo, Japan

[21] Appl. No.: 545,039

[22] PCT Filed: Apr. 23, 1983

[86] PCT No.: PCT/JP83/00128
§ 371 Date: Sep. 28, 1983
§ 102(e) Date: Sep. 28, 1983

[87] PCT Pub. No.: WO83/03875
PCT Pub. Date: Nov. 10, 1983

[30] Foreign Application Priority Data

Apr. 23, 1982 [JP] Japan .................................. 57-68435
Apr. 23, 1982 [JP] Japan .................................. 57-68436
Apr. 30, 1982 [JP] Japan .................................. 57-73772

[51] Int. Cl.³ ............................................. F02B 19/08
[52] U.S. Cl. ................................ 123/276; 123/193 P; 123/279
[58] Field of Search ............... 123/262, 263, 275, 276, 123/279, 280, 289, 290, 193 P

[56] References Cited

U.S. PATENT DOCUMENTS

| | | | |
|---|---|---|---|
| 2,975,773 | 3/1961 | Meurer | 123/276 X |
| 3,144,008 | 8/1964 | List | 123/276 X |
| 4,083,330 | 4/1978 | Morris | 123/276 |

FOREIGN PATENT DOCUMENTS

| | | | |
|---|---|---|---|
| 1122323 | 1/1962 | Fed. Rep. of Germany | 123/276 |
| 54263 | 4/1980 | Japan | 123/276 |
| 807712 | 1/1959 | United Kingdom | 123/276 |

Primary Examiner—Tony M. Argenbright
Attorney, Agent, or Firm—Flynn, Thiel, Boutell & Tanis

[57] ABSTRACT

The present invention relates to a combustion chamber in a direct-injection diesel engine. The combustion chamber has a restriction at its inlet and a plurality of recesses in a side surface thereof. Atomized streams of fuel are injected at equal angular intervals from a fuel nozzle having injection ports which are one more than the recesses. The recesses make the piston top surface thinner, and would thermally destruct stepped portions of valve clearances defined in the piston for intake and exhaust valves. To prevent this, the stepped portions of the valve clearances are displaced off the recesses. The side surface of the combustion chamber with which the atomized fuel collides is inclined at an angle of 45° with respect to the piston top surface. With the above construction, good and quiet fuel combustion can be achieved throughout the full range of engine rotation.

19 Claims, 16 Drawing Figures

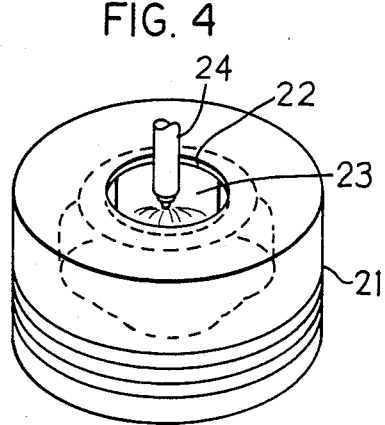
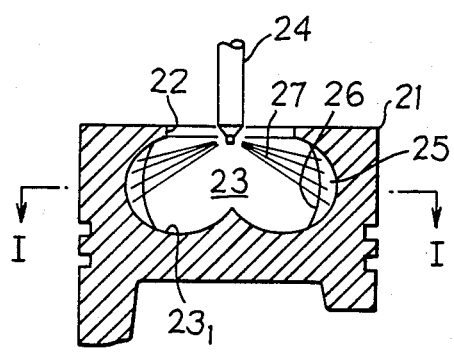
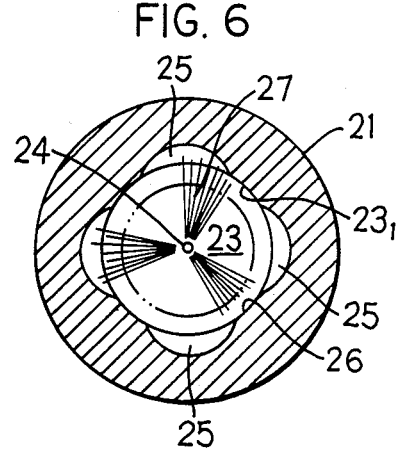
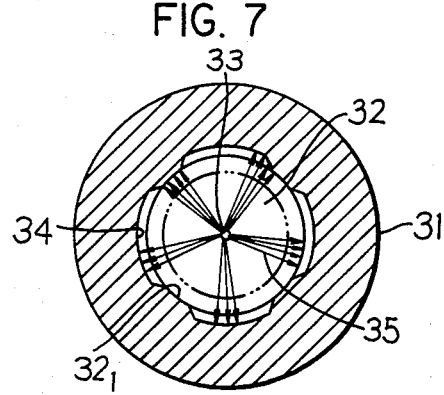

4,538,566

COMBUSTION CHAMBER IN A DIESEL ENGINE

DESCRIPTION

Technical Field

The present invention relates to a combustion chamber in a diesel engine, and more particularly to a combustion chamber in a diesel engine, which is defined by a cavity of a specific shape formed in a top surface of a piston.

Background Art

Diesel engines have pistons with cavities defined in their top surfaces and fuel nozzles for injecting fuel into the cavities. With such direct-injection type diesel engines, various attempts have been made to provide combustion chamber configurations to improve the condition of combustion in the combustion chambers.

One known prior art will be described which is directed to an improved combustion chamber configuration for improving combustion.

FIG. 1 of the accompanying drawings is illustrated in Japanese Patent Publication No. 56-28210. A cavity 2 is defined in a top surface of a piston 1 with a restriction 3 disposed at an inlet of the cavity 2. The restriction 3 is small with $D_1/D_2=0.85$–$0.98$ according to the Publication.

The restriction 3 according to the prior art shown in FIG. 1 has the following advantages:

On the compression stroke of the piston 1, air is caused to flow in the directions of the arrows $S_1$ from a zone Z surrounded by a peripheral portion of the piston 1 and a cylinder head 4 into a combustion chamber 5 immediately before the piston 1 reaches its top dead center. The flows $S_1$ are normally referred to as squishing streams. These squishing streams serve to disturb a swirl S in the combustion chamber 5 to provide an improved mixture of air and fuel injected from a fuel injection nozzle 6. The squishing streams $S_1$ are also created when the fuel starts being combusted as the piston is in the vicinity of the top dead center. More specifically, when fuel starts to be injected, the fuel begins being combusted at a few locations in the combustion chamber 5. The pressure in the combustion chamber 5 is abruptly incrased to force the combustion gas in the combustion chamber 5 to flow back into the zone Z in the directions of the arrows $S_2$, these gas flows being referred to as counter squishing streams. The counter squishing streams $S_2$ are kept by the restriction 3 in the combustion chamber for a certain period ot time, and thereafter are allowed to flow abruptly into the zone Z as the streams $S_2$. This increases the rate of utilization of air in the zone Z and improves the combustion efficiency due to rapid combustion.

Another example of an improved combustion chamber configuration will be described. FIGS. 2 and 3 are shown in U.S. Pat. No. 3,302,627. A cavity 12 is defined in a top surface of a piston 11 and has lateral ridges 13 which makes the cavity 12 petal-shaped with four petals. Atomized fuel streams $P_1$–$P_4$ from a fuel nozzle 14 are oriented off the ridges 13 in the direction of a swirl S, that is, downstream of the ridges 13 in the direction of the swirl S.

The conventional combustion chamber 15 enables the ridges 13 to produce fuel streams $S_3$ directed to the center of the combustion chamber 15 and acting to develop an improved mixture of fuel and air in the combustion chamber 15.

The prior art constructions however fail to provide effective matching between the direction of fuel injection and the position of arrival of atomized fuel through the shape of the combustion chamber and the fuel nozzle.

DISCLOSURE OF THE INVENTION

It is an object of the present invention to provide a combustion chamber construction in a diesel engine for reducing HC in the exhaust gas to thereby improve fuel economy and reduce harmful pollutants in the exhaust gas.

According to the present invention, a cavity defining a combustion chamber has recesses in its side surface, and fuel is injected toward various portions of the side face of the cavity.

BRIEF DESCRIPTION OF THE DRAWINGS

FIG. 4 is a perspective view illustrating an embodiment of the present invention;

FIG. 5 is a vertical cross-sectional view of the piston shown in FIG. 4;

FIG. 6 is a horizontal cross-sectional view taken along line I—I of FIG. 5;

FIG. 7 is a horizontal cross-sectional view showing another embodiment of the present invention;

BEST MODE FOR CARRYING OUT THE INVENTION

Figure 1:
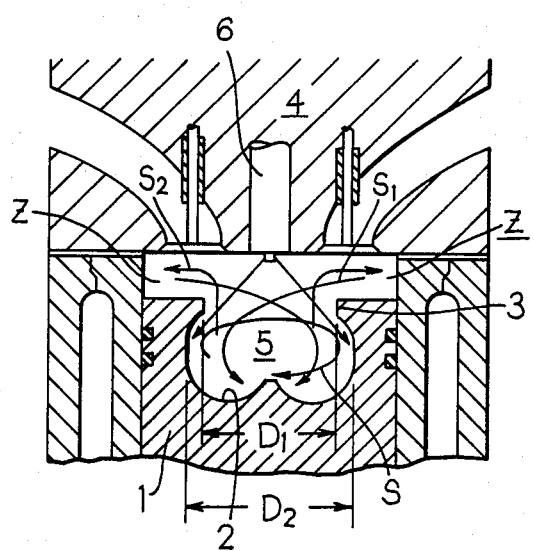
FIG. 1 is a vertical cross-sectional view of a known combustion chamber.
Figure 2:
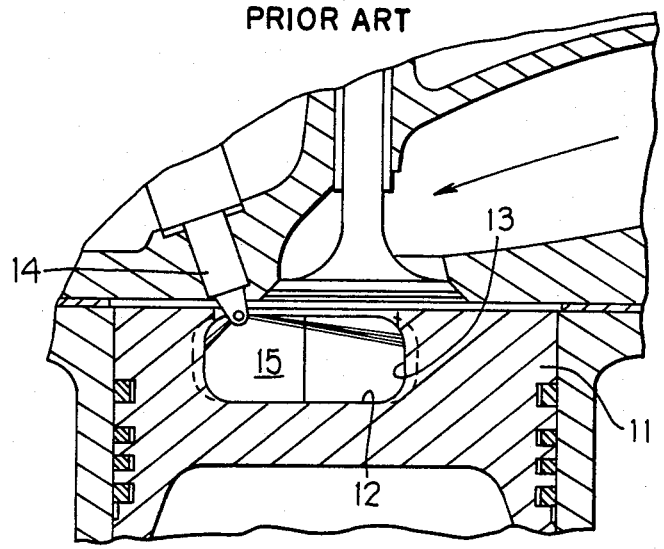
FIG. 2 is a vertical cross-sectional view of another known combustion chamber.
Figure 3:
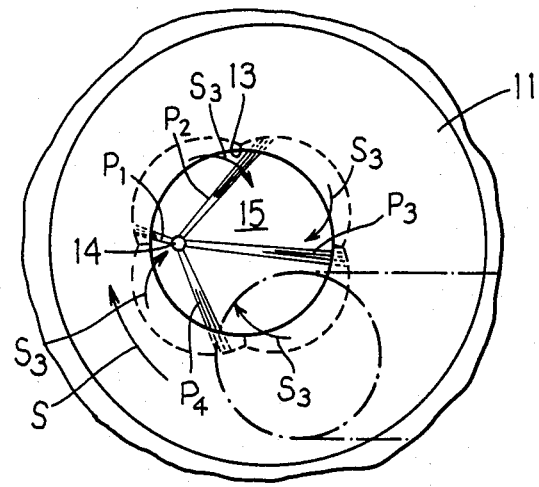
FIG. 3 is a plan view showing the piston in FIG. 2.
Figure 8:
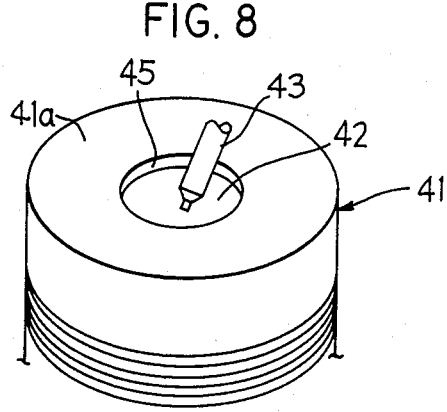
FIG. 8 is a perspective view illustrative of still another embodiment of the present invention.
Figure 9:
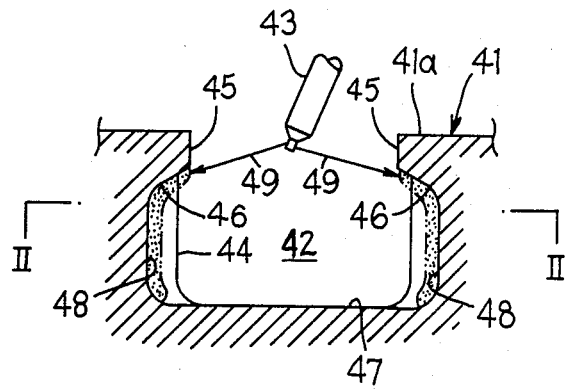
FIG. 9 is a vertical cross-sectional view of the piston shown in FIG. 8.
Figure 10:
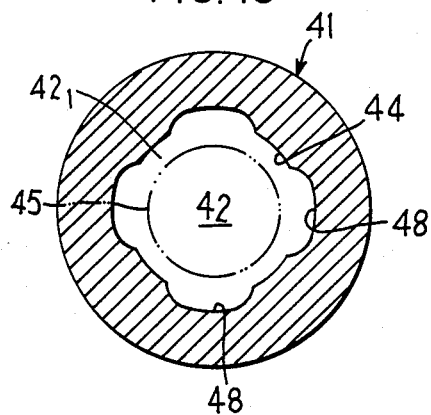
FIG. 10 is a horizontal cross-sectional view taken along line II—II of FIG. 9.

According to the present invention, a cavity has recesses in its inner peripheral side surface, and atomized fuel injected from a fuel nozzle is suitably selected in relation to the recesses for improving fuel combustion throughout the full range of engine rotations.

An embodiment of the present invention will be described with reference to FIGS. 4 through 6.

A piston 21 reciprocable in a cylinder (not shown) has a combustion chamber 23 defined in its top surface and having a restriction 22 extending toward the center around the entire peripheral edge of an inlet of the combustion chamber. A fuel nozzle 24 is mounted on a cylinder head (not shown) for injecting fuel toward a side surface of a cavity $23_1$ by which the combustion chamber 23 is defined. The foregoing components constitute a diesel engine.

The cavity $23_1$ has recesses 25 defined in plural locations on the side surface and contiguous to the side surface. The side surface is left at least as surfaces (side surfaces) 26 between adjacent recesses 25. Each recess 25 is defined by a curved surface having a radius of curvature smaller than that of the curved surface which defines the side surface 26 of the cavity $23_1$. The recesses 25 and the side surfaces 26 are rendered contiguous smoothly to each other by arcuately ground junctions. It is necessary however to provide the side surfaces 26 left between the adjacent recesses 25. With the recesses 25, the width of the restriction 22 is partly increased. The number of the recesses 25 varies with the size of the combustion chamber 23. The number of recesses 25 may equal the number of injection ports in the fuel nozzle 24 or may be one less or more than the number of injection ports for varying the shapes of the areas where the streams of fuel injected from the injection ports hit the side surface of the cavity.

With the foregoing construction, streams of fuel 27 injected from the fuel nozzle 24 are mixed with air while they are caused to flow by the swirl, and partly hit the side surfaces 26 of the cavity $23_1$ and then are splashed back toward the center of the cavity. Where the number of the injection ports in the fuel nozzle 24 is different from the number of recesses 25, for example, where the recesses 25 are one more than the injection ports in the fuel nozzle 24 with the recesses and injection ports being equally angularly spaced, the injection fuel streams from the injection ports hit the cavity surfaces at different location and hence under different conditions to change the property of the air-fuel mixture. This allows the property of the air-fuel mixture to be ideal in at least one location under varied engine operating conditions, resulting in reliable ignition to start fuel combustion. Any delay in ignition is reduced for smooth fuel combustion under any engine operating conditions.

The recesses 25 permit the length of the restriction 22 to be partly increased, thus generating sufficient squishing streams for increased combustion efficiency. The recesses 25 also make the inner surface of the combustion chamber smoothly concave and convex, a structure which causes the swirl to produce localized vortices (small vortices) which promote evaporation of fuel attached to the side surface of the combustion chamber, thus reducing the time required for combustion. Since sufficiently strong squishing streams can be created without having to increasing the overall size of the restriction, the flame confined temporarily in the combustion chamber by the restriction is introduced into the squishing area at a suitable time. This suppresses the production of exhaust gas components and increases the rate of air utilization, thereby improving the density of discharged smoke and the rate of fuel consumption. The surfaces 26 of the cavity $23_1$ are left as surfaces between the recesses 25 to make a combustion chamber shape which is advantageous from the standpoint of a thermal load.

With the foregoing embodiment of the invention, strong squishing streams can be produced without having to enlarged the restriction, the swirl produced in the combustion chamber is effective in inducing localized vortices (disturbances) for improving the mixture between air and fuel, and the period of time in which the flames are confined is prevented from being excessively long. The production of exhaust gas components can therefore be suppressed without delaying the timing of fuel injection, and the combustion efficiency can be increased to improve the rate of fuel consumption and the density of discharged smoke. With no edges or corners on the inner surface of the combustion chamber, there are no heat spots and at the same time the discharged amount of unburned fuel due to incomplete combustion can be reduced.

According to an embodiment shown in FIG. 7, a combustion chamber 32 defined by a cavity $32_1$ is formed in a top surface of a piston 31, and fuel is injected from a fuel nozzle 33 toward the side surface of the cavity $32_1$. The side surface of the cavity $32_1$ has recesses 34. Cones 35 of atomized fuel which are one more than the recesses 34 are injected at equal angular intervals.

The above embodiment has the same advantages as those of the embodiment shown in FIGS. 4 through 6.

It is known that the angle at which an atomized stream of fuel hits the cavity wall defining a combustion chamber has a bearing on the condition of fuel combustion.

An embodiment will hereinafter be described with reference to FIGS. 8 through 11.

A piston 41 reciprocably movable in a non-illustrated cylinder has a combustion chamber 42 defined by a cavity $42_1$ in a top surface thereof. A fuel nozzle 43 is attached to a non-illustrated cylinder head for injecting fuel toward a side wall 44 of the cavity $42_1$. The foregoing components constitute a direct-injection type diesel engine.

The side wall 44 of the cavity $42_1$ has a ridge 45 extending fully around an upper edge and toward the center for producing stronger squishing streams to strengthen a swirl in the combustion chamber. The ridge 45 has a lower surface inclined at substantially 45° with respect to the top surface 41a of the piston 41, the inclined lower surface serving as a collision surface 46 with which atomized fuel will collide. The side wall 44 which extends substantially vertically from the collision surface 46 toward a bottom wall 47 has recesses 48 defined in a plurality of circumferential positions by curved surfaces contiguous to the side wall 44 fully in the direction of depth. Thus, the combustion chamber 42 has a petal-shaped horizontal cross-sectional shape below the collision surface 46.

Atomized streams of fuel 49 injected from the fuel nozzle 43 are mixed with air while they are forced to flow by a swirl, and collide with the collision surface 46 formed at the upper edge of the side wall 44 of the cavity $42_1$. The fuel streams 49 are then guided by the collision surface 46 so as to be splashed back along the side wall 44 and the recesses 48 as shown by the two-dot-and-dash lines in FIG. 9. This reduces atomized fuel as splashed toward the center of the combustion chamber 42, resulting in a mode of combustion close to vaporized fuel combusion in which combustion in a first period is reduced.

The ridge 45 on the upper end of the side wall 44 of the cavity $42_1$ serves to produce strong squishing streams which strengthen the swirl in the combustion chamber 42. Since the side wall 44 of the cavity $42_1$ is rendered smoothly concave and convex by the recesses 48, the swirl flowing circumferentially along the side wall 44 is oscillated radially. This causes localized vortices (small vortices) to be generated in the vicinity of the side wall 44, the vortices serving to separate a thin film of fuel from the side wall 44 and the recesses 48. Accordingly, fuel vaporization from the side wall 44 is promoted to complete fuel combustion within a short period of time, thus enabling the engine to produce a high output.

The length of the ridge 45 is partly increased by the recesses 48. Strong squishing streams can be produced without having to increase the overall length of the ridge 45. Nevertheless, flames that have temporarily been confined in the combustion chamber 42 by the ridge 45 are introduced into the squishing area at a suitable time through short ridge portions. In addition to the suppression of NOx due to the reduced combustion in the first period, air can be utilized at an increased rate for thereby improving the density of discharged smoke and the rate of fuel consumption.

To suppress incomplete combustion due to atomized fuel blown onto the top surface of the piston, it has been conventional practice to keep the depth of collision (depth of the collision surface) of the atomized fuel at ½-⅓ of the depth of the combustion chamber while somewhat sacrificing the generation of NOx. According to the present invention, the lower surface of the ridge 45 is inclined substantially at 45° with respect to the top surface 41a of the piston 41 to prevent the fuel from splashing toward the center and upwardly. Therefore, the depth of collision of the atomized fuel can be reduced to about ¼ of the depth of the combustion chamber 42.

Figure 11:
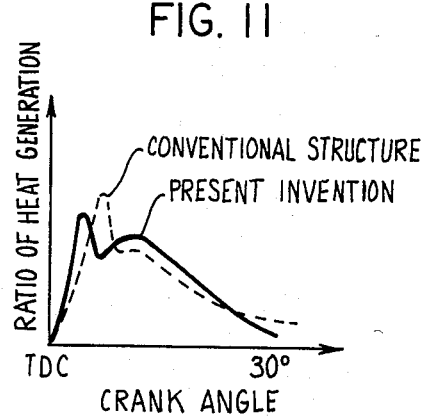
FIG. 11 is a graph showing the relationship between the ratio of heat generation and the crank angle according to the embodiment of FIG. 8 as plotted in comparison with data from a conventional structure.

With conventional combusion chambers of the mixed combustion type, a large amount of atomized fuel is splashed back toward the center of the combustion chamber, and the combustion in the first period has been increased as shown by the broken line in FIG. 11. According to the present invention, since the amount of atomized fuel as splashed back toward the center of the combustion chamber is small, the combustion in the first period is reduced as shown by the solid line in FIG. 11. The strengthened swirl and small vortices caused thereby enable fuel to be vaporized from the side wall, with the results that dispersed combustion is promoted and the time required for fuel combustion is shortened.

While in the foregoing embodiment the ridge extends fully around the upper end of the side wall of the combustion chamber, the desired object can be achieved by providing a ridge only where atomized fuel hits the side wall. While side walls are left as surfaces between adjacent recesses to prevent heat spots from being produced between the recesses, such positive surfaces may not necessarily be left between the adjacent recesses dependent on thermal loads. In the illustrate embodiment, four recesses are defined at equal angular intervals in the circumferential direction of the side wall of the combustion chamber. However, the number of such recesses is not limited to the illustrated arrangement.

With the above embodiment, the lower surface of the ridge provided to obtain strong squishing streams is inclined substantialy at 45° with respect to the top surface of the piston to form the surface of collision with atomized fuel, reducing the amount of floating atomized fuel due to splashing from the side wall as compared with conventional combustion chambers of the mixed combustion type. Therefore, vaporized fuel combustion with reduced combustion in the first period is carried out to thereby improve exhaust characteristics and noise. The swirl strengthened by the ridge is oscillated by the recesses in the side wall in a direction substantially perpendicular to the direction in which the fuel swirls, thus inducing small vortices in the vicinity of the side wall which serve to separate a thin film of fuel from the wall surface for promoted fuel vaporization. This activates dispersed fuel combustion to reduce the period required for combustion, thereby enabling the engine to produce a high output and improving the rate of fuel consumption. Sluggish engine starting operation and incomplete combustion during operation under light (no) loads can also be improved which would be caused by conventional combustion chambers of the vaporized fuel combustion type.

Ordinary piston top surfaces have valve clearances for intake and exhaust valves. The valve clearances serve to prevent the intake and exhaust valves from hitting the piston top surface when the piston reaches the top dead center. The valve clearances are defined in the piston top surface as recesses having the same diameter as those of the intake and exhaust valves.

The piston with the restriction at the inlet of the combustion chamber and the recesses in the side surface of the cavity becomes small in thickness due to the valve clearances in the top surface, resulting in a tendency of the piston surface to be cracked under thermal stresses. More specifically, the thickness of the piston top surface where the restriction and the recesses are positioned is reduced, and the valve clearances located at the thin portion of the piston tend to cause the latter to be cracked under thermal stresses.

The thermal stresses are liable to concentrate on the valve clearance for the exhaust valve, which is apt to have an increased temperature at the wall surface.

The following construction is designed to position the exhaust valve for eliminating the foregoing difficulty.

Figure 12:
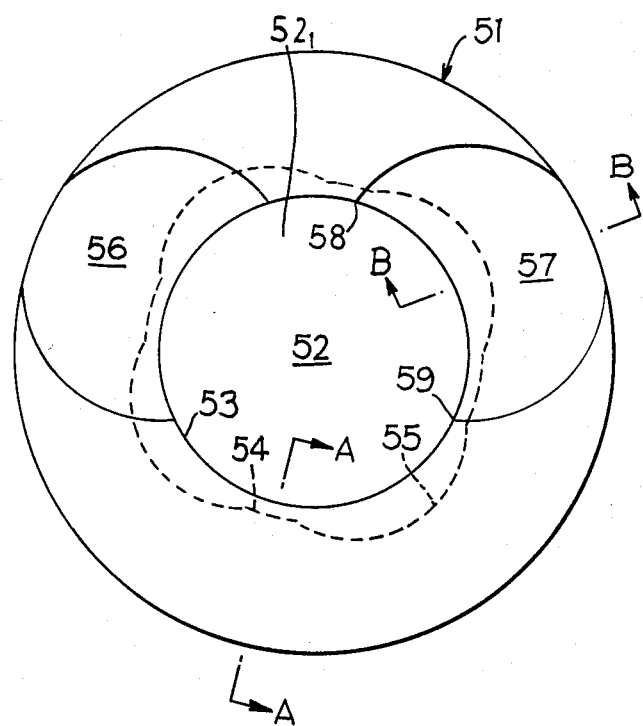
FIG. 12 is a plan view of a piston according to a still further embodiment of the present invention.
Figure 13:
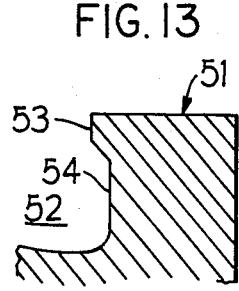
FIG. 13 is a vertical cross-sectional view taken along line A—A of FIG. 12.
Figure 14:
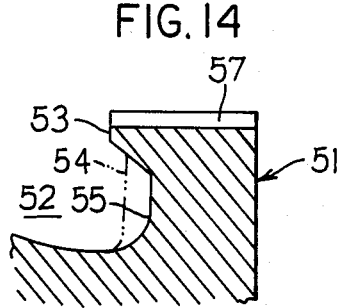
FIG. 14 is a vertical cross-sectional view taken along line B—B of FIG. 12.

FIGS. 12 through 14 illustrate an example of such construction.

A combustion chamber 52 is defined by a cavity 52₁ formed centrally in a top surface of a piston 51 reciprocably movable in a cylinder (not shown). A restriction 53 projects fully around a peripheral edge of an inlet of the combustion chamber 52 and toward the center of the inlet. The cavity 52₁ has a side surface 54 in which a plurality of recesses 55 are defined with the side surface 54 being left as surfaces between adjacent recesses 55 to render the side surface of the cavity 52₁ concave and convex in shape.

The top surface of the piston 51 also has a valve clearance 56 positioned in confronting relation to the lower surface of an intake valve and a valve clearance 57 positioned in confronting relation to the lower surface of an exhaust valve. The valve clearances 56, 57 have portions extending across the combustion chamber 52 to allow the intake and exhaust valves to be large in size for increasing the intake and exhaust efficiencies.

In this arrangement, the points where the exhaust valve clearance 57 and the combustion chamber intersect, that is, the ends 58, 59 of steps defining the valve clearance 57 which are close to the combustion chamber are positioned out of alignment with the recesses 55, thereby reducing the length of projection of the restriction 53 at the points of intersection 58, 59.

With the foregoing construction, atomized fuel injected from a non-illustrated fuel injection nozzle is mixed with air while being forced to flow by a swirl in the combustion chamber and is partly caused to hit the side surface 54 (including the recesses 55) of the cavity $52_1$ and splash back toward the center. Where the number of injection ports in the nozzle is different from the number of the recesses 55, the surfaces from which the atomized fuel from the injection ports are splashed back are differently shaped to thereby vary the property of the air-fuel mixture. The property of the air-fuel mixture is therefore diversified as a whole in the combustion chamber. No matter how the engine operating condition is varied, there is an air-fuel mixture of an ideal property at least in one location in the combustion chamber, so that the fuel can be ignited well with a reduced ignition delay, and combusted smoothly.

Since the side surface 54 of the cavity $52_1$ has the recesses 55, the extent of projection of the restriction 53 is partially increased. This provides a sufficient squishing effect to generate a better swirl in the combustion chamber 52 which creates localized vortices in the recesses 55. These localized vortices are effective in promoting vaporization of fuel from the wall surface. As a consequence, the combustion efficiency is improved and at the same time the period of time for combustion is shortened.

The restriction 53 is partly enlarged by the recesses 55 defined in the side surface 54 to generate strong squishing streams, and it is not necessary to increase the extent of projection of the restriction 53 as a whole. Flames which have been confined by the restriction 53 in the combustion chamber 52 are allowed to flow through areas free of the recesses 55 onto a flat portion (squishing area) of the top of the piston at a suitable timing. Therefore, the generation of exhaust gas components is suppressed, and the rate of air utilization is rendered higher to improve the discharged smoke density and the fuel consumption ratio.

Because the valve clearance 57 for the exhaust valve subjected to a large thermal load and the combustion chamber 52 intersect at the points 58, 59 positioned where the extent of projection of the restriction 53 is small, the thermal load at the ends 58, 59 of the valve clearance 57 is reduced to lessen the concentration of thermal stresses thereon. There is no need to round the distal edge of the restriction 53 through the sacrifice of the squishing effect, and there is also no need to reduce the size of or omit the valve clearances through the sacrifice of a dead volume, for reducing stresses concentrating on the recess of the valve clearance. The piston is thus rendered more resistant to the danger of getting cracked.

While in the embodiment the points 58, 59 of intersection between the valve clearance 57 and the combustion chamber 52 are located at areas free of the recesses 55, the points 58, 59 may be positioned at areas where the recesses 55 are shallow (the restriction 53 projects a small extent). The valve clearance for the intake valve which is thermally more advantageous may be positioned from the standpoint of the layout of the valve. Where there is expected a large thermal load such as with a supercharged engine, the points of intersection between the intake valve clearance and the combustion chamber should be positioned in areas where the extent of projection of the restriction is small in the same manner as that of the exhaust valve clearance.

With the foregoing embodiment, as described above, the restriction is provided on the entire peripheral edge of the inlet of the combustion chamber, the side surface of the combustion chamber has a plurality of recesses to provide localized increases in the extent of projection of the restriction, and the intersecting points between the combustion chamber and the exhaust valve clearance are located where the extent of projection of the restriction is small. This renders the piston more resistant to the tendency of becoming cracked without lowering the combustion efficiency.

The foregoing embodiments can be summarized as follows:

(1) The restriction should be located at the inlet of the combustion chamber.
(2) The recesses should be defined in the side surface of the cavity which defines the combustion chamber.
(3) Atomized streams of fuel should be directed toward various locations on the cavity side surface. To this end, cones of fuel different in number from the recesses may be injected at equal angular intervals or at irregular angular intervals against various portions of the cavity side surface.
(4) The inner wall surface of the cavity against which the atomized fuel collides should be inclined at 45° with respect to the top surface of the piston.
(5) The steps of the recess defining the valve clearance should be positioned out of alignment with the recesses referred to in (2) from the standpoint of thermal stresses.

Figure 15:
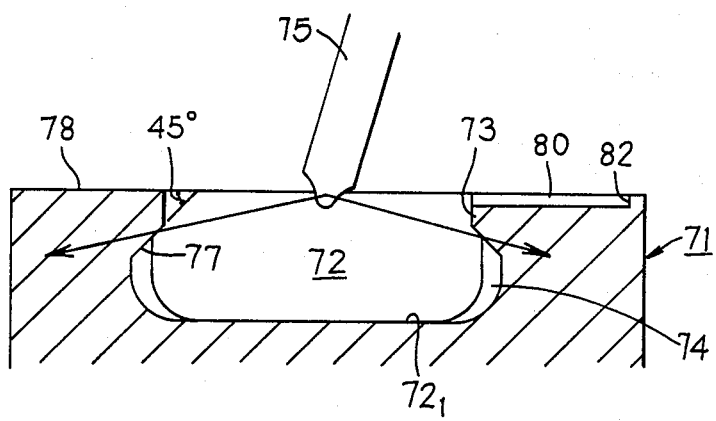
FIG. 15 is a vertical cross-sectional view showing a most preferred embodiment of the present invention.
Figure 16:
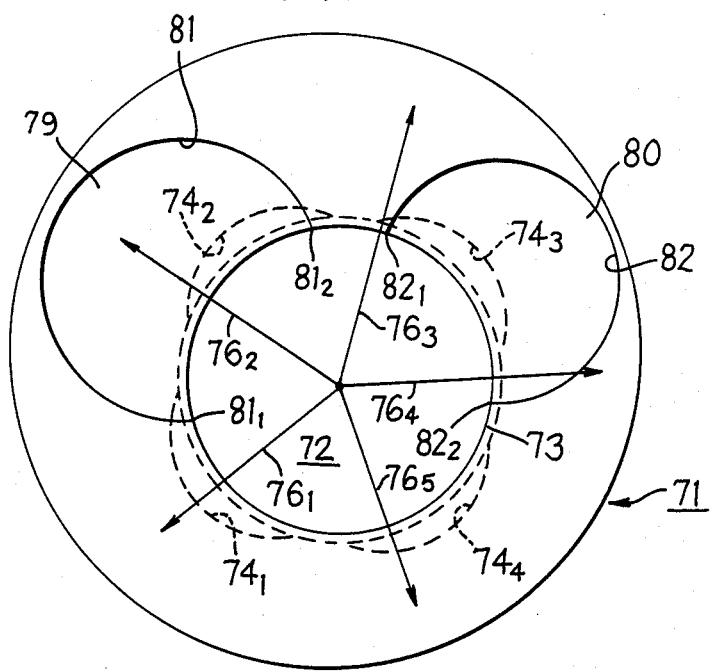
FIG. 16 is a plan view of the piston shown in FIG. 15.

A most preferred embodiment of the present invention which incorporates the foregoing points (1) through (5) will now be described with reference to FIGS. 15 and 16.

A combustion chamber 72 is defined by a cavity $72_1$ in a top surface of a piston 71. There is a restriction 73 at an inlet of the combustion chamber 72 at an upper edge thereof. The cavity $72_1$ has a side surface with four recesses $74_1$–$74_4$ defined therein. The side surface of the cavity $72_1$ which is free of the recesses $74_1$–$74_4$ constitutes a circle extending around the center of the combustion chamber 72.

A fuel nozzle 75 injects five cones of fuel $76_1$–$76_5$ into the cavity $72_1$. An inner wall surface 77 of the cavity $72_1$ against which the five fuel cones $76_1$–$76_5$ collide is inclined at 45° with respect to a top surface 78 of the piston 71.

The fuel cones $76_1$–$76_5$ are directed to hit the side surface of the cavity $72_1$ at various positions.

The piston top surface 78 has an intake valve clearance 79 and an exhaust valve clearance 80. The intake valve clearance 79 has a stepped portion 81 intersecting the inlet of the combustion chamber 72 at points $81_1$, $82_2$ positioned at areas where the recess $74_1$ or $74_2$ are not deep or are shallow. The exhaust valve clearance 80 has a stepped portion 82 intersecting the inlet of the combustion chamber at points $82_1$, $82_2$ at areas where there are no recesses $74_1$–$74_4$.

The most preferred embodiment thus constructed according to the present invention has the following advantages:

On the compression stroke, the restriction 73 produces squishing streams to provide a better mixture of fuel and air. During the combustion stroke, flames are temporarily kept in the combustion chamber, and then counter squishing streams are created. This finishes the combustion in a short period of time, and increases the ratio of air utilization for an improved combustion state.

Since atomized flows of fuel hit the side surface of the cavity $72_1$ at varying positions, there will always be a location in the combustion chamber where an air-fuel mixture of good property is available throughout the full range of engine rotation. Therefore, good fuel combustion can be achieved from a low-speed range to a high-speed range.

With the angle of collision of atomized fuel being 45°, quiet fuel combustion can be accomplished and the period of time required for combustion is shorter than that in a mode of vaporized fuel combustion, thus increasing the combustion efficiency.

No thermal destruction occurs as the stepped portions of the valve clearances do not overlap the recesses or only overlap shallow portions of the recesses.

I claim:

1. A combustion chamber in a diesel engine, characterized in that the combustion chamber is defined in a top surface of a piston, an inlet in said top surface for communication with an upper end of the combustion chamber, a flow restriction at said inlet, a plurality of recesses in a surrounding side surface of the combustion chamber, and fuel nozzle means for injecting atomized streams of fuel toward different wall portions of the combustion chamber such as deep portions of the recesses, shallow portions of the recesses, and portions free of the recesses, said fuel nozzle means including a number of injection ports which is different from the number of said recesses for causing the atomized streams of fuel to be injected toward said different wall portions.

2. A combustion chamber according to claim 1, wherein the numbers of recesses and injection ports are different by one.

3. A combustion chamber in a diesel engine, characterized in that the combustion chamber is defined in a top surface of a piston, an inlet in said top surface for communication with an upper end of the combustion chamber, a plurality of recesses in a surrounding side surface of the combustion chamber, and fuel nozzle means having injection ports for injecting atomized streams of fuel toward different wall portions of the combustion chamber such as deep portions of the recesses, shallow portions of the recesses, and portions free of the recesses, said fuel nozzle means including a number of said injection ports which is different from the number of said recesses by one.

4. A combustion chamber in a diesel engine, characterized in that the combustion chamber is defined in a top surface of a piston, an inlet in said top surface for communication with an upper end of the combustion chamber, a flow restriction at said inlet, a plurality of recesses in a surrounding side surface of the combustion chamber, and fuel nozzle means having injection ports for injecting atomized streams of fuel toward different wall portions of the combustion chamber such as deep portions of the recesses, shallow portions of the recesses, and portions free of the recesses, said top surface of the piston having at least one valve clearance space defined therein for accommodating an exhaust valve therein, said valve clearance space creating a stepped portion with said top surface, said stepped portion intersecting said restriction so that said clearance space communicates with said inlet, said stepped portion intersecting said restriction at a pair of angularly spaced points which are aligned with areas in said surrounding side surface which are either free of said recesses or intersect said recesses adjacent the edges thereof where said recesses have only shallow portions.

5. A combustion chamber according to claim 4, wherein said top surface of the piston has a second valve clearance space defined therein for accommodating an intake valve, the second valve clearance having a stepped portion intersecting the top surface, the stepped portion of said second valve clearance intersecting said restriction for communication with the inlet at a pair of points which are aligned with areas on the surrounding sidewall of the combustion chamber which are either free of said recesses or have only shallow portions of said recesses.

6. A combustion chamber in a diesel engine, characterized in that the combustion chamber is defined in a top surface of a piston, an inlet in said top surface for communication with an upper end of the combustion chamber, a flow restriction at said inlet, a plurality of recesses in a surrounding side surface of the combustion chamber, and fuel nozzle means having injection ports for injecting atomized streams of fuel toward different wall portions of the combustion chamber such as deep portions of the recesses, shallow portions of the recesses, and portions free of the recesses, said restriction being formed substantially as an annular flange which projects radially inwardly with respect to the surrounding side surface of the combustion chamber throughout the full annular extent thereof so as to define said inlet of smaller diameter than said surrounding side surface, said flange defining on the underside thereof an inner annular wall surface which slopes outwardly and downwardly at an angle of substantiall 45° with respect to said top surface, said inner wall surface merging smoothly with said surrounding side surface, and said fuel nozzle means causing said atomized streams of fuel to be injected against said inner wall surface.

7. A combustion chamber according to claim 6, wherein the angular pattern of the atomized streams injected by the fuel nozzle means and the angular pattern of the recesses, when viewed from above the piston, are different so that the atomized streams are directed toward different wall portions of the combustion chamber which have different configurations or spacings from the injection ports, the fuel nozzle means being disposed with the fuel injection ports positioned substantially at the central longitudinal axis of the combustion chamber.

8. In a piston for a diesel engine, the piston having a combustion chamber formed in the upper end thereof, the piston having a top surface provided with an inlet opening formed therein for communication with an upper end of the combustion chamber, the combustion chamber including a generally cylindrical cavity having a surrounding and generally cylindrical sidewall, and fuel nozzle means having a plurality of injection ports for injecting a plurality of atomized streams of fuel into the combustion chamber in angularly spaced relationship therearound, comprising the improvement wherein the combustion chamber includes a plurality of recesses which are formed in and project radially outwardly from said surrounding sidewall, said recesses being angularly spaced apart and each extending over a substantial angular extent with respect to said sidewall, said sidewall having angularly extending regions which are located between adjacent pairs of said recesses, and the angular spacing between the plurality of fuel streams being different from the angular spacing between the plurality of recesses so that the individual fuel streams are directed toward different wall portions on the recesses and surrounding sidewall to provide different combustion characteristics.

9. A piston according to claim 8, wherein the number of injection ports is different from the number of recesses.

10. A piston according to claim 9, wherein the number of injection ports differs from the number of recesses by one, the recesses and the injection ports both being uniformly angularly spaced around the combustion chamber.

11. A piston according to claim 10, wherein the injection ports are disposed substantially on the longitudinally extending central axis of the combustion chamber.

12. A piston according to claim 8, wherein each recess is defined by a curvature which results in the recess having both shallow and deep portions with respect to the cylindrical sidewall as the recess extends circumferentially along the sidewall.

13. A piston according to claim 12, wherein each recess is defined by a partial cylindrical wall which is generated about a radius substantially smaller than the radius of said cylindrical cavity, the radius for said recess being centered between said cylindrical sidewall and the central axis thereof so that the recess has a variable depth with respect to the cylindrical sidewall as the recess extends circumferentially therealong, and the recesses being angularly spaced apart so as to define an arcuate segment of said cylindrical sidewall of substantial arcuate extent therebetween.

14. A piston according to claim 13, wherein the number of injection ports is different from the number of recesses.

15. A piston according to claim 8, wherein an annular flangelike wall is formed on the piston adjacent the upper end of the combustion chamber, said flangelike wall projecting radially inwardly with respect to the cylindrical sidewall for defining said inlet opening, said inlet opening being of a diameter which is smaller than the diameter of said cylindrical cavity.

16. A piston according to claim 15, wherein said annular flangelike wall defines an inner surface thereon which constitutes a part of the boundary wall of said combustion chamber, said inner surface being sloped downwardly and outwardly from the inlet opening at an angle of substantially 45° with respect to the top surface of the piston so that said inner surface merges with said surrounding sidewall, and said fuel nozzle means causing said fuel streams to be injected against said inner surface.

17. A piston according to claim 16, wherein the nozzle means has the injection ports disposed substantially on the central longitudinal axis of the cylindrical cavity.

18. A piston according to claim 17, wherein the number of injection ports is different from the number of recesses by one.

19. A piston according to claim 8, including a clearance space formed in the top surface of said piston for accommodating the head of an exhaust valve, said clearance space being formed in and opening downwardly from said top surface for defining a stepped configuration therewith, said clearance space projecting radially inwardly so as to open into said inlet opening, the stepped configuration of said clearance space intersecting said inlet opening at a pair of angularly spaced points which are substantially radially aligned with wall areas of the surrounding sidewall which are free of said recesses or where said recesses are shallow.

* * * * *